(12) United States Patent
Butt (10) Patent No.: US 9,591,159 B1
(45) Date of Patent: Mar. 7, 2017

(54) MOBILE DOCUMENT COPIER

(71) Applicant: UMM AL-QURA UNIVERSITY, Makkah (SA)

(72) Inventor: Salman Butt, Makkah (SA)

(73) Assignee: Umm Al-Qura University, Makkah (SA)

(*) Notice: Subject to any disclaimer, the term of this patent is extended or adjusted under 35 U.S.C. 154(b) by 0 days.

(21) Appl. No.: 15/003,827

(22) Filed: Jan. 22, 2016

(51) Int. Cl.
| | | |
|---|---|---|
| *H04N 1/024* | (2006.01) | |
| *H04N 1/40* | (2006.01) | |
| *G06K 9/22* | (2006.01) | |
| *H04N 1/00* | (2006.01) | |
| *H04N 1/10* | (2006.01) | |
| *H04N 1/028* | (2006.01) | |

(52) U.S. Cl.
CPC ..... *H04N 1/00787* (2013.01); *H04N 1/00689* (2013.01); *H04N 1/00692* (2013.01); *H04N 1/00708* (2013.01); *H04N 1/00734* (2013.01); *H04N 1/02815* (2013.01); *H04N 1/1065* (2013.01); *H04N 2201/0091* (2013.01); *H04N 2201/0096* (2013.01)

(58) Field of Classification Search
None
See application file for complete search history.

(56) References Cited

U.S. PATENT DOCUMENTS

| | | | | | |
|---|---|---|---|---|---|
| 4,196,450 A | * | 4/1980 | Miller | ..................... | G06K 15/00 348/552 |
| 5,442,449 A | * | 8/1995 | Stemmle | .................. | B41J 29/00 347/214 |
| 6,040,572 A | * | 3/2000 | Khovaylo | .......... | H04N 1/00519 250/208.1 |
| 6,265,706 B1 | * | 7/2001 | Oliver | .................... | H04N 1/047 250/208.1 |
| 6,271,939 B1 | * | 8/2001 | Hu | ..................... | H04N 1/00538 358/473 |
| 6,429,422 B1 | * | 8/2002 | Bohn | ..................... | H04N 1/047 250/234 |
| 6,459,506 B1 | * | 10/2002 | Hu | ..................... | H04N 1/00236 358/473 |
| 6,585,341 B1 | * | 7/2003 | Walker | .................... | B41J 2/125 250/559.44 |

(Continued)

OTHER PUBLICATIONS

"StandScan Pro—Portable Photo & Document Scanner", http://standscan.com/index.php/product/standscan-pro.html, Apr. 7, 2015, 4 pages.

*Primary Examiner* — Madelein Nguyen
(74) *Attorney, Agent, or Firm* — Oblon, McClelland, Maier & Neustadt, L.L.P.

(57) ABSTRACT

A portable copier system including an upper panel having a device groove and a camera slot, an object sensor for measuring an object size and detecting presence or absence of an object, a lower panel fitted with a plurality of guides, wherein each of the plurality of guides is attached with an object sensor, an adjustment mechanism comprising a plurality of extendible rods, wherein each of the plurality of extendible rods is connected to the upper panel and supported by the lower panel, an image capture device mounted on the device groove, and a controller that controls the adjustment mechanism based on data from the object sensor data and sends signal to the image capture device.

16 Claims, 9 Drawing Sheets

(56) References Cited

U.S. PATENT DOCUMENTS

| | | | | |
|---|---|---|---|---|
| 6,806,453 B1* | 10/2004 | Vincent | B41J 3/4076 | 235/472.01 |
| 7,808,681 B2* | 10/2010 | Hatzav | G03G 15/221 | 358/474 |
| 7,990,556 B2* | 8/2011 | King | H04N 1/00244 | 358/1.15 |
| 8,600,196 B2* | 12/2013 | King | G06Q 30/00 | 358/474 |
| 8,836,959 B2* | 9/2014 | Park | G06K 9/228 | 358/1.11 |
| 9,280,696 B1* | 3/2016 | Fraser | G06K 9/00577 | |
| 2002/0131636 A1* | 9/2002 | Hou | G06F 1/1626 | 382/181 |
| 2003/0133629 A1* | 7/2003 | Sayers | G06F 1/1626 | 382/313 |
| 2004/0245334 A1* | 12/2004 | Sikorski | G06F 1/1626 | 235/383 |
| 2007/0111713 A1* | 5/2007 | Silverbrook | H04M 1/21 | 455/414.1 |
| 2008/0297855 A1* | 12/2008 | Silverbrook | B41J 3/44 | 358/473 |
| 2011/0072395 A1* | 3/2011 | King | G06F 17/241 | 715/825 |
| 2012/0199753 A1* | 8/2012 | Chuang | G01V 5/0008 | 250/390.04 |
| 2012/0262764 A1* | 10/2012 | Deng | H04N 1/107 | 358/473 |
| 2013/0010321 A1 | 1/2013 | Shen | | |
| 2013/0057927 A1 | 3/2013 | Durant et al. | | |
| 2013/0155474 A1* | 6/2013 | Roach | G06Q 20/322 | 358/505 |
| 2014/0160350 A1 | 6/2014 | Takabatake et al. | | |
| 2014/0183269 A1* | 7/2014 | Glaser | G06F 21/32 | 235/492 |
| 2014/0368373 A1* | 12/2014 | Crain | G01S 5/02 | 342/5 |

* cited by examiner

MOBILE DOCUMENT COPIER

BACKGROUND

Description of the Related Art

A copier or a scanner creates a duplicate version of a printed text, photo, handwriting or an object in general. The scanned object can be printed on a paper or stored as a digital image. Commonly, a flat-bed scanner is used to scan documents in offices and homes. The scanner requires a power source for operation and is typically connected to a computer or a server.

Scanning or copying is a routine operation performed in business offices, homes, or schools for various purposes such as record keeping, photos sharing, or identity verification. Typically, documents, photos, books, magazine covers, etc. are scanned for personal and official purposes. Personal documents and photos that are used for legal purposes such as immigration check, passport issue, visa issue, etc. particularly require clear and high image quality. Once the documents are scanned, they can be stored as an image file, converted into pdf format and emailed to a desired person, or sent to a printer for printing.

A wireless device such as a smart phone or a tablet with a camera can be used for scanning or copying an object. However, a camera image is subject to a degree of distortion, reflections, shadows, low contrast, and blur due to camera shake and focusing issues. Although, resolution and image quality maybe sufficient for less demanding applications.

Due to the increased use of wireless devices such as smart phones or tablets with a camera, a scanning device employing a smart phone is highly desired. Furthermore, the scanning device should be capable of capturing quality images, easy to carry, foldable, light weight and operable on low battery power. Thus, there remains a continuing need to provide improved scanning devices that provide greater performance, portability and ease of use.

SUMMARY

According to an embodiment of the present disclosure, there is provided a portable copier system apparatus. The portable copier system includes an upper panel including a device groove and a camera slot, an object sensor for measuring an object size and detecting presence or absence of an object, a lower panel fitted with a plurality of guides, each of the plurality of guides is attached with an object sensor; an adjustment mechanism including a plurality of extendible rods, each of the plurality of extendible rods is connected to the upper panel and supported by the lower panel, an image capture device mounted in the device groove, and a controller that controls the adjustment mechanism based on data from the object sensor and sends signals to the image capture device.

Further, according to an embodiment of the present disclosure, there is provided a method for controlling a portable copier including an first panel and a second panel. The method including turning on a plurality of lights, adjusting a plurality of guides on the first panel, wherein each of the plurality of paper guides is attached with an object sensor, determining an object size of an object positioned on the first panel, calculating an optimum object distance based on the object size, extending between the first panel and the second panel to move the second panel with respect to the first panel, capturing an image of an object, and storing or printing the image of the object.

Further, according to an embodiment of the present disclosure, there is provided a non-transitory computer-readable medium which stores a program which, when executed by a computer, causes the computer to perform the method for controlling a portable copier The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor,", "significantly" and similar terms generally refer to ranges that include the identified value within a margin of 20%, 10% or preferably 5% in certain embodiments, and any values therebetween.

Figure 1:
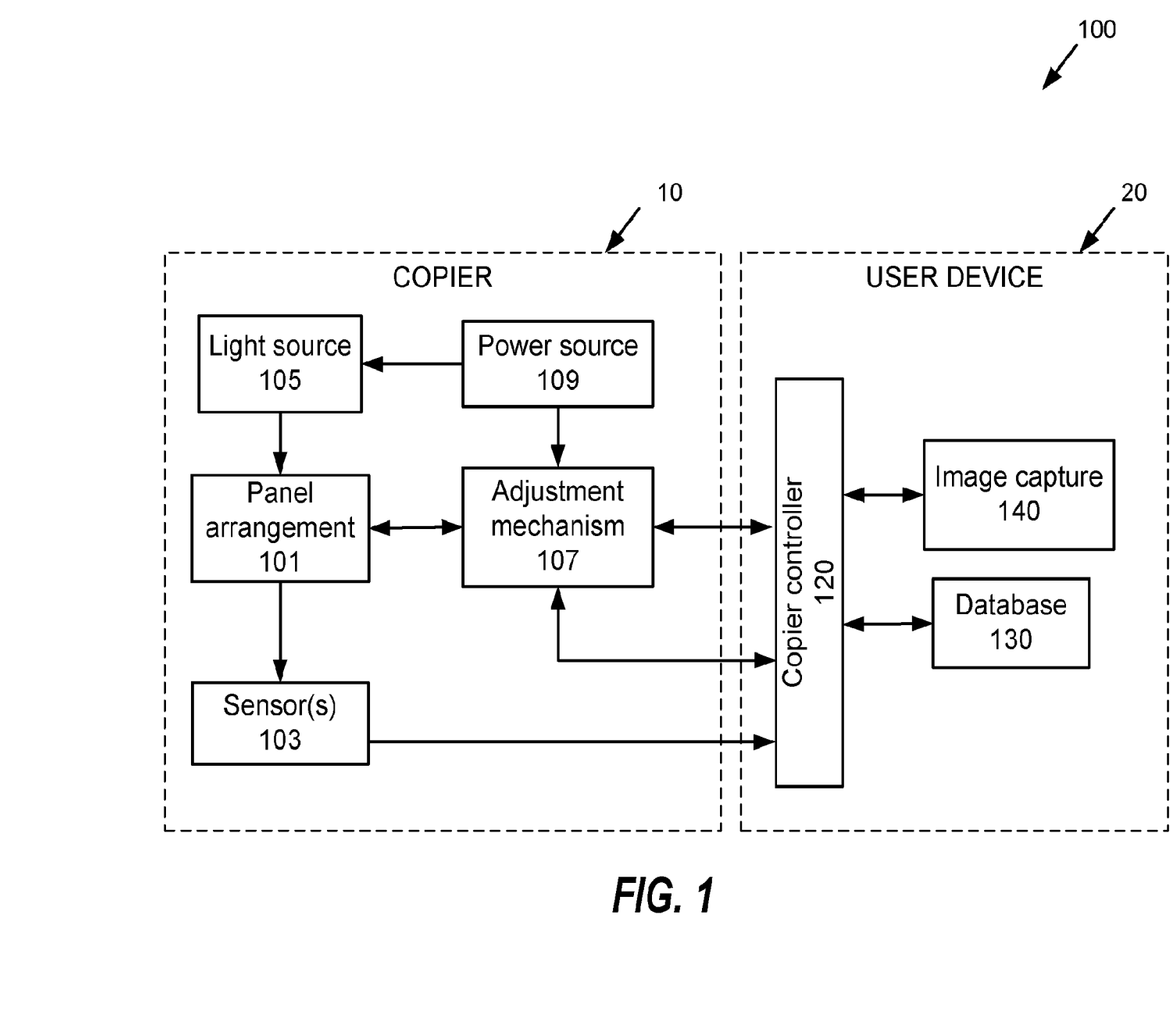
FIG. 1 is a block diagram of an exemplary document copier system according to an embodiment of the present disclosure.

FIG. 1 is a block diagram of an exemplary document copier system according to an embodiment of the present disclosure. A copier system 100 includes a copier 10 and a user device 20. The copier 10 includes a panel arrangement 101, a sensor(s) 103, an adjustment mechanism 107, and a power source 109. Optionally, the copier 10 can include a light source 105. The panel arrangement 101 is attached to the adjustment mechanism 107 which is controlled by the copier controller 120. The copier controller 120 controls the adjustment mechanism 107 so as to move the panel arrangement 101 to an optimal position for capturing a clear image of an object to be scanned. The user device 20 includes a copier controller 120, an image capture device 140, and a database 130. Optionally, the user device 20 can be connected to other peripherals such as printer or a computer. The connections can be wired or wireless. The copier controller 120 controls the adjustment mechanism 107 based on the sensor(s) 103.

The panel arrangement 101 can include one or more panels with one panel configured to mount a user device, for example, a groove for the user device 20. In a two panel arrangement, two panels can be stacked such that one panel is movable with respect to a second fixed panel. The fixed panel can support an object to be scanned. Furthermore clamps can be attached to the fixed panel to hold the object in place. On the other hand, the movable panel can be moved using the adjustment mechanism 107, which is controlled by the copier controller 120. The panels can be attached to the adjustment mechanism 107 such that the adjustment mechanism 107 can move the movable panel in a linear or a circular manner as well as tilt about one of the linear axis such as x-axis, y-axis or z-axis. The panels can be of any shape such as rectangular, oval, circular etc. In an alternative embodiment, the fixed panel can support the user device.

The sensor(s) 103 can be installed on the fixed panel, the movable panel or both for detecting the presence or absence of an object, size of an object, temperature, surrounding light etc. The sensor(s) 103 can include one or more sensors that are sensitive to light, change in magnetic field, motion, temperature, pressure etc. For example, the sensor can be a proximity sensor which is sensitive to change in optical property or a pressure sensor which is sensitive to pressure exerted by an object. The sensor can be used for detecting edges of an object or a paper placed on the panel. Further, a height sensor can be installed to determine the distance between the object and the movable panel. Furthermore, the sensor(s) 103 data can be transmitted to the copier controller 120 for determining the size of the paper or object.

The light source 105 can be installed on the fixed panel, the movable panel or both to illuminate an object placed on one of the panels for scanning. The light source 105 can be a bulb or one or more LED lights. The light source 105 can be powered by power source 109 which can be installed in the panel arrangement 101. The power source 109 can be an external power source or a battery installed in the panel arrangement 101. The power source 109 can also be used to power the adjustment mechanism 107 as well.

The adjustment mechanism 107 moves the panel on which the user device 20 is mounted. The adjustment mechanism 107 is activated when an object to be scanned is placed on a panel opposite to the user device 20. The adjustment mechanism 107 can move the panel in a linear or circular manner with or without tilting the panel. The adjustment mechanism 107 includes an actuator which can be controlled by the copier controller 120. The control motion of the adjustment mechanism 107 is governed by the copier controller 120. Furthermore, the adjustment mechanism 107 can be detached from the panel arrangement 101 or folded within the panel arrangement 101 to form a box such as a briefcase that is portable and easy to carry.

The copier controller 120 can be installed on the user device 20 or on the copier 10. The copier controller 120 sends control commands to the adjustment mechanism 107 based on the signal(s) received from the sensor(s) 103. Based on the control command, the adjustment mechanism 107 moves the panel with the user device 20 to an optimal scanning position. An optimal scanning position enables the user device 20 to capture a clear image with minimal distortion. The optimal scanning position can be predetermined using testing and stored in the database. For instance, the position can depend on factors such as distance to the object, size of the object, luminosity around the object, surrounding temperature, etc. During the testing, the image quality can be assessed manually or using an image processing software. The image processing software can be stored in the user device or in the copier controller 120. An optimal position database can be created by varying one or more factors during the testing and the data can be correlated to the position of the panel.

Figure 2:
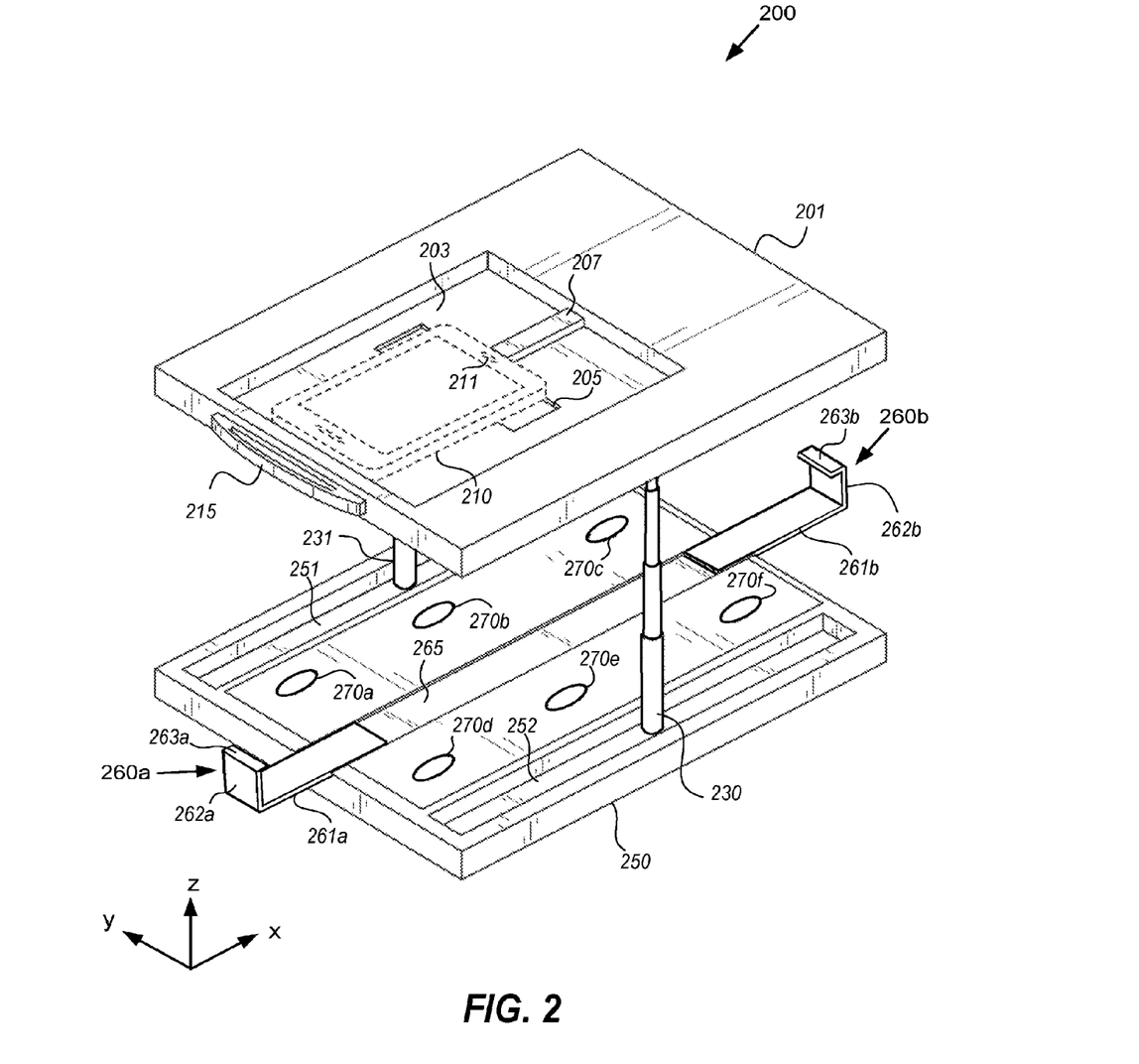
FIG. 2 illustrates an exemplary copier in a fully extended position according to an embodiment of the present disclosure.

FIG. 2 illustrates an exemplary copier in a fully extended position according to an embodiment of the present disclosure. An exemplary copier 200 includes an upper panel 201, a lower panel 250, two extendible rods 230 and 231, and a plurality of object sensors 260a and 260b. Optionally, the exemplary copier 200 can include a plurality of LED lights 270a-270f. The upper panel 201 is connected to the extendible rods 230 and 231, which enable movement of the upper panel 201 in upward and downward directions. The extendible rods 230 and 231 are supported by the lower panel 250. The lower panel 250 includes the base 261 and the plurality of LED lights 270a-270f. Alternatively, the plurality of LED lights 270a-270f can be provided on the bottom surface of the upper panel 201.

The upper panel 201 includes a device groove 203, a camera slot 205, a device holder 207 and optionally, a handle 215. The top surface of the device groove 203 can provide a setting location for a handheld device such as a smart phone 210, a tablet, or a camera. The device groove 203 size can be larger than the handheld device such as smart phone 210. In another embodiment, a groove of particular shape of the handheld device such as iphone, Ipad®, Samsung phones etc. can be designed. The device groove 203 can be located significantly in the center of the upper panel 201. However, in other embodiments, the device groove 203 can be located close to the circumference of the upper panel 201. The upper panel 201 further includes the device groove 203, which is an opening approximately in the center of the upper panel 201. The device groove 203 can be located away from the center in certain embodiments. A lens of the camera 211 of the smart phone 210 is placed over the device groove 203 to capture an image of an object placed on the lower panel 250. The device groove 203 can be of any shape and size greater than the lens of the camera 211 of the handheld device. For example, the device groove 203 can be a small circular hole slightly greater than the size of the lens of the camera 211 of the handheld device, or a rectangular slot extending partially or entirely within the device groove 203.

The device holder 207 ensures that the smart phone 210 is held in place such that the smart phone 210 does not move or slide off when the upper panel 201 moves. The device holder 207 can be a clip that grips the smart phone 210 on one of the sides. Alternatively, the device holder 207 can be a spring activated gripper which applies pressure on one or more of the edges of the smart phone 210. The device holder 207 can be tabs, a band, a strap, or other structure to hold the smart phone 210 in place. The smart phone 210 can be held in place and slipping prevented due the frictional force between the smart phone 210 and the device groove 203. In the present embodiment, the device holder 207 project perpendicularly towards the camera slot 205 from the edge of the device groove 203. The device holder 207 grips the edge of the smart phone 210 close to the camera 211. Furthermore, the top surface of the device holder 207 can project over the smart phone 210 to prevent the smart phone 210 from moving vertically. In another embodiment, two device holders 207 can be provided parallel to the camera slot 205 to grip the smart phone 210 on its sides. It should be noted that the present disclosure is not limited to one device holder 207 and one or more device holders 207 may be available in a different embodiment.

In another embodiment, the device holder 207 and the smart phone 210 can be movable along the camera slot 205 to capture a panoramic image. The panoramic image may be useful when the object is too large to fit in the field-of-view of the camera.

The extendible rods 230 and 231 can be connected to the upper panel 201, on the bottom surface close to the edge. The extendible rods 230 and 231 can be a telescopic cylinder operated by hydraulic or pneumatic pressure. Alternatively, the extendible rods 230 and 231 can be a screw-type arrangement operated by a motor. The length of the extendible rods 230 and 231 can be controlled by a copier controller 120 installed on the smart phone 210. Alternatively, the extendible rods 230 and 231 can be configured to be controlled manually. For instance, a length marking and locking mechanism can be provided on the extendible rods 230 and 231 to extend and lock the extendible rods 230 and 231 in a desired position. Both the extendible rods 230 and 231 can be operated simultaneously to extend or retract to similar lengths. Alternatively, each of the extendible rods 230 and 231 can be controlled independently and can be extended or retracted to different lengths. In another embodiment, more than two extendible rods can be provided. For example, four extendible rods can be attached to the upper panel 201, one at each corner of the upper panel 201. Furthermore, each of the extendible rods can be operated simultaneously or independently.

The extendible rods 230 and 231 control the object distance $D_{object}$, i.e. the distance between the upper panel 201, more particularly the camera lens, and the lower panel 250. The optimum object distance $D_{image}$ can be based on the object size. A relationship between the object distance $D_{object}$ and the object size can be established based on image quality and stored in a database. For example, factors such as object distance $D_{image}$ and the object size can be varied during a testing process where an expected outcome is a high quality image. The testing data can be stored in the database 130. Furthermore, camera specifications such as focal length, field of view, magnification, aperture size, etc. can be stored for different cameras. For example, camera specification of different smart phones such as IPHONE, SAMSUNG etc. or specification of cameras manufactured by CANON, NIKON etc. can be stored.

The lower panel 250 includes an object size sensor 260 such as object size sensors 260a and 260b, and optionally can include rod grooves 251 and 252, and a plurality of LED lights 270a-270f. The object size sensors 260a and 260b can be configured similar to guides installed in a printer tray. Furthermore, the object size sensor 260a (or 260b) can be fitted with an optical sensor, which responds when an object placed in the path of a light beam. The object size sensor 260a (or 260b) is configured to slide away from or towards the center of the lower panel 250. For instance, the object size sensors 260a and 260b can be installed in a guide groove 265 formed along the x-axis in the center of the lower panel 250. Furthermore, the object size sensor 260a (260b) has a predetermined length and is installed at the center such that the distance between the two object size sensors 260a and 260b, which are opposite to each other, is minimum. The distance between object size sensors 260a and 260b is measured as the distance between webs 262a and 262b, which are significantly parallel to each other. A web 262a (or 262b) is an element connecting a lip 263a (or 263b) and a base 261a (or 261b) of the object size sensors 260a and 260b. The distance between the webs 262a and 262b is the object length $L_{object}$. The lower panel 250 can be configured to display predetermined distance markings which can correspond to the object length $L_{object}$. For example, a zero marking can be made at the center of the lower panel 250 and a measuring scale such as a ruler can be used to mark the distances away from the center along the length (or width) of the lower panel 250. Then the object length will be sum of the distance markings corresponding to the webs 262a and 262b.

In certain embodiments, a proximity sensor can be installed on the lower panel 250 or object size sensors 260a and 260b to determine object length $L_{object}$. For instance, a proximity sensor (not shown) can be installed at the center of the lower panel 250 and the proximity sensor can be coupled with the object size sensor 260a or 260b or both, to determine the distance between the object size sensors 260a and 260b.

In another embodiment, two or more object size sensors 260 configured similar to the object size sensors 260a and 260b can be installed on the lower panel 250 in a perpendicular manner to the object size sensor 260a and object size sensor 260b. For instance, two object size sensors 260 can be installed in a groove (not shown) along the y-axis. Further distance marking, as discussed above, can be to determine the distance between the two additional object size sensors 260. As such, both length and width of an object can be determined by the copier controller 120 using distance measurement from the plurality of object size sensor 260.

The object size sensors 260a and 260b can be configured to move independently or simultaneously. For instance, a base 261a can move away from the center of the lower panel 250, while a base 261b is stationary. Alternatively, the base 261a can be coupled (for instance, using a gear system driven by a motor) with the base 261b such that both the base 261a and the base 261b can move simultaneously by same amount.

Furthermore, the object size sensors 260a and 260b can be moved manually or automatically. For instance, for manual operation, a groove corresponding to the object size sensors 260a and 260b can be formed on the lower panel 250 and the object size sensors 260a and 260b can be fit in a sliding manner in the grooves. When an object is placed on the top surface of the lower panel 250, the object size sensors 260a and 260b can be moved to touch the edges of the object to get the object length $L_{object}$.

In another embodiment, the size of the object can be manually input in the copier controller 120 via a graphical user interface (GUI). A GUI can be programmed to communicate with the copier controller 120. Furthermore, the GUI can be a part of the copier controller 120. As GUI programming is well known and can be present in many forms, the details are omitted for brevity.

The rod grooves 251 and 252 can be profiled to hold the extendible rods 230 and 231 in an erect position when in operation or to conceal the extendible rods 230 and 231 in a horizontal manner when not in operation. The rod grooves 251 and 252 can be provided in the upper panel 201 or the lower panel 250. For instance, referring to FIG. 2, the rod grooves 251 and 252 provided on the lower panel 250 have a semi-circular cross-section and length greater than or equal to the length of the extendible rods 230 and 231. As such, the extendible rods 230 and 231 having cylindrical shape can rest in the rod grooves 251 and 252, when in laid in a horizontal position. Within the rod grooves 251 and 252, a hole may be created to secure the base of the extendible rods 230 and 231 when in an erect position. In an alternative embodiment, the rod grooves 251 and 252 can include a threaded hole and the base of the extendible rods 230 and 231 can have external threads. As such, the extendible rods 230 and 231 can be screwed in the threaded holes of the rod grooves 251 and 252. In an alternative embodiment, the extendible rods 230 and 231 can be attached to a roller which can slide along the rod grooves 251 and 252 to move the extendible rods 230 and 231 between a vertical position and a horizontal position.

Figure 3:
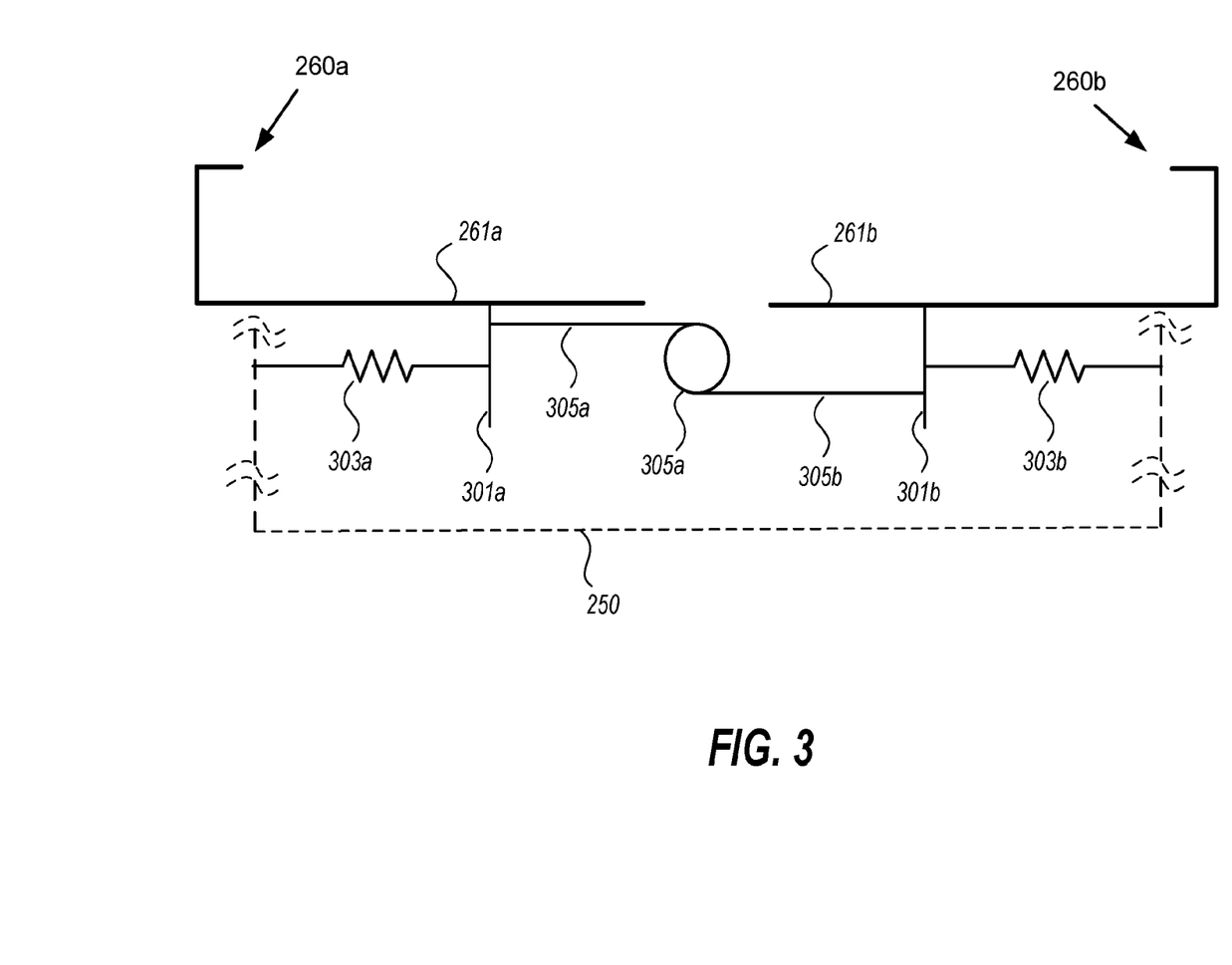
FIG. 3 illustrates a sample mechanism for automatic operation of the object size sensor according to an embodiment of the present disclosure.

FIG. 3 illustrates a sample mechanism for automatic operation of the object size sensor 260. The object size sensors 260a and 260b can be configured to be spring loaded on one side and attached to a cord which can be wrapped around a shaft connected to a motor. For instance, the bases 261a and 261b have projections 301a and 301b respectively, extending from the bottom. The projection 301a is attached with a spring 303a on the left and a cord 305a on the right; while projection 301b is attached with a spring 303b on the right and a cord 305b on the left. The cords 305a and 305b are wrapped around a shaft of a motor 307. When the motor 307 rotates clockwise, the cords 305a and 305b pull the object size sensors 260a and 260b respectively, towards each other against the spring force of springs 303a and 303b.

When the motor 307 rotates counter-clockwise, the spring forces pull the object size sensors 260a and 260b away from each other. Furthermore, the motor rotation can be controlled by the copier controller 120 based on input from the optical sensor installed on the object size sensor 260a and the object size sensor 260b. For instance, when an object is placed on the lower panel 250, the motor 307 can start rotating in the clockwise direction and stop when the optical sensor detects the edge of the object.

Referring back to FIG. 2, the plurality of LED lights 270a-270f can be activated automatically based on a weight sensor or a proximity sensor installed on the lower panel 250, or manually by providing an on-off switch on the lower panel 250. The plurality of LED lights 270a-270f provide illumination for increasing the clarity of the image captured.

Figure 4:
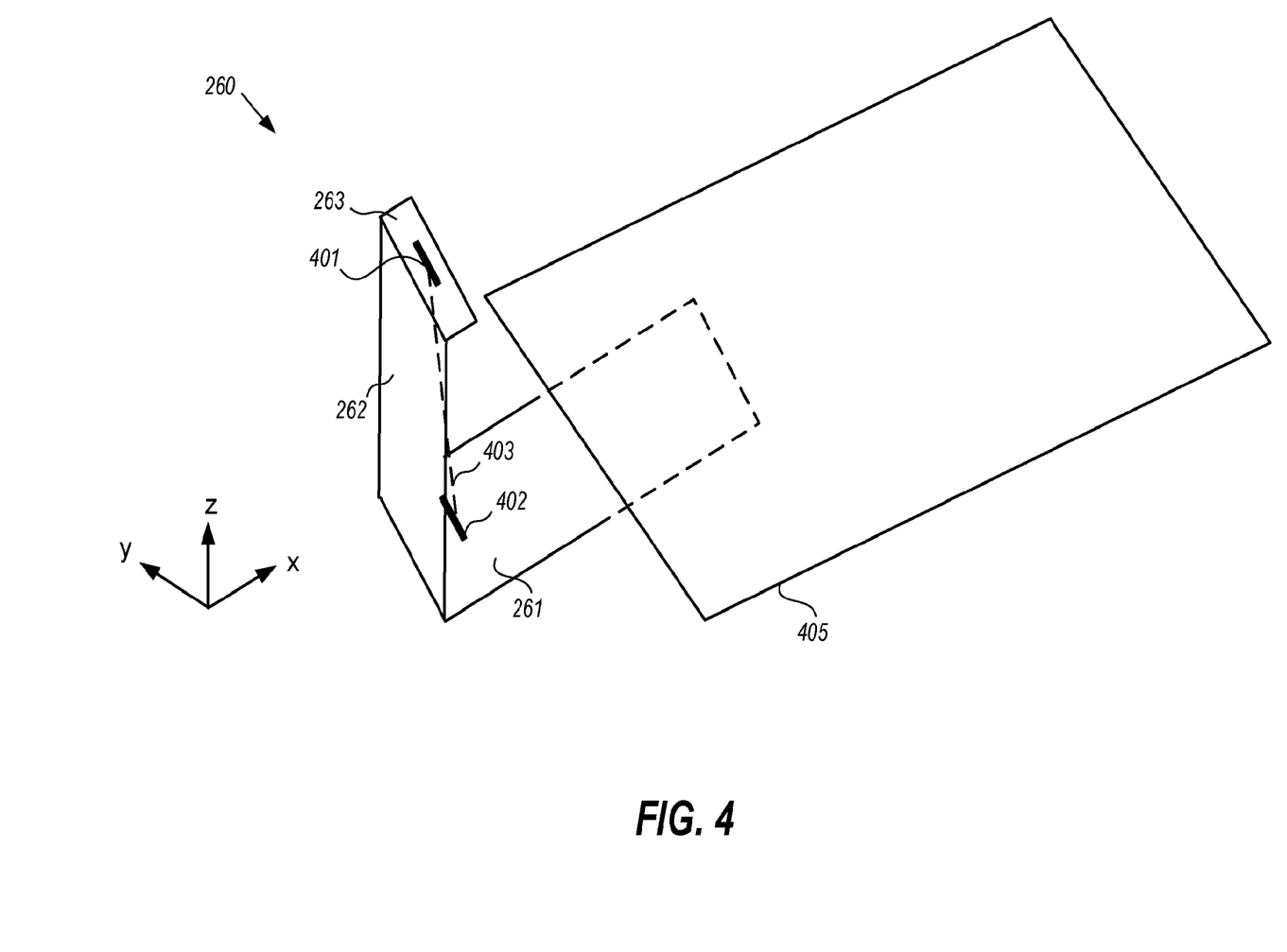
FIG. 4 illustrates a guide fitted with an optical sensor according to an embodiment of the present disclosure.

FIG. 4 illustrates a object size sensor fitted with an optical sensor according to an embodiment of present disclosure. The object size sensor 260 includes a base 261, a web 262, a lip 263, and an optical sensor. The object size sensor 260 is fitted on the lower panel 250, as discussed earlier in the present disclosure. The base 261 and the lip 263 can be connected to the web 262 in a fixed manner or a flexible manner. For example, the web 262 can be hinged to the base 261 and the lip 263 to enable relative motion between the connected elements. On the other hand, the web 262 can be welded to the base 261 and the lip 263 to prevent relative motion between the connected elements.

An example, optical sensor can include a transmitter 401 attached to the bottom surface of the lip 263 and a receiver 402 attached to the top surface of the base 261. The transmitter 401 transmits a light beam 403 which is received by the receiver 402 to complete the sensor circuit. Any interruption of transmitted light beam 403 will cause the sensor circuit to stay open, which can indicate the presence of an object. For instance, when the edge of the paper 405 touches the web 262, the light beam 403 is cut off from the receiver 402. The interruption of the light beam 403 can be converted into a signal by the optical sensor circuitry that can be sent to the copier controller 120 for further processing. For example, the signal can indicate an edge was detected and the movement of the object size sensor 260 can be stopped.

Figure 5:
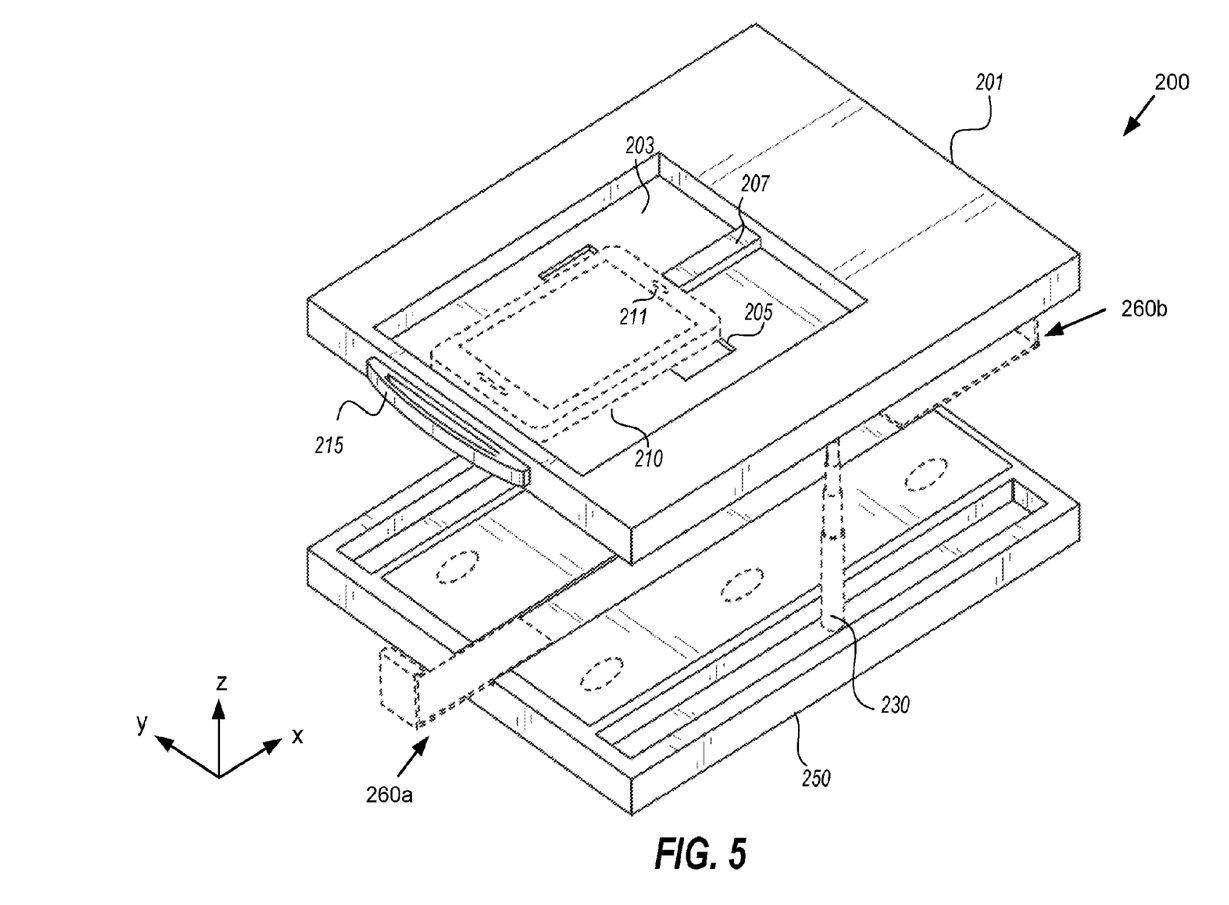
FIG. 5 illustrates a copier occupying a partially extended position according to an embodiment of the present disclosure.

FIG. 5 illustrates an exemplary copier occupying a partially extended position according to an embodiment of present disclosure. The extendible rods 230 and 231 can be extended fully or to any intermediate length based on the size of an object placed on the lower panel 250. As the size of the object decreases the camera can be brought closer to the object to capture the minute details clearly or the zoom feature of a camera can be used. However, using zoom feature may affects the quality of the image and may even crop a part of the object. As such, in the present disclosure, the camera 211 mounted on the upper panel 201 is brought closer to the lower panel 250 by decreasing the length of the extendible rods 230 and 231.

Figure 6:
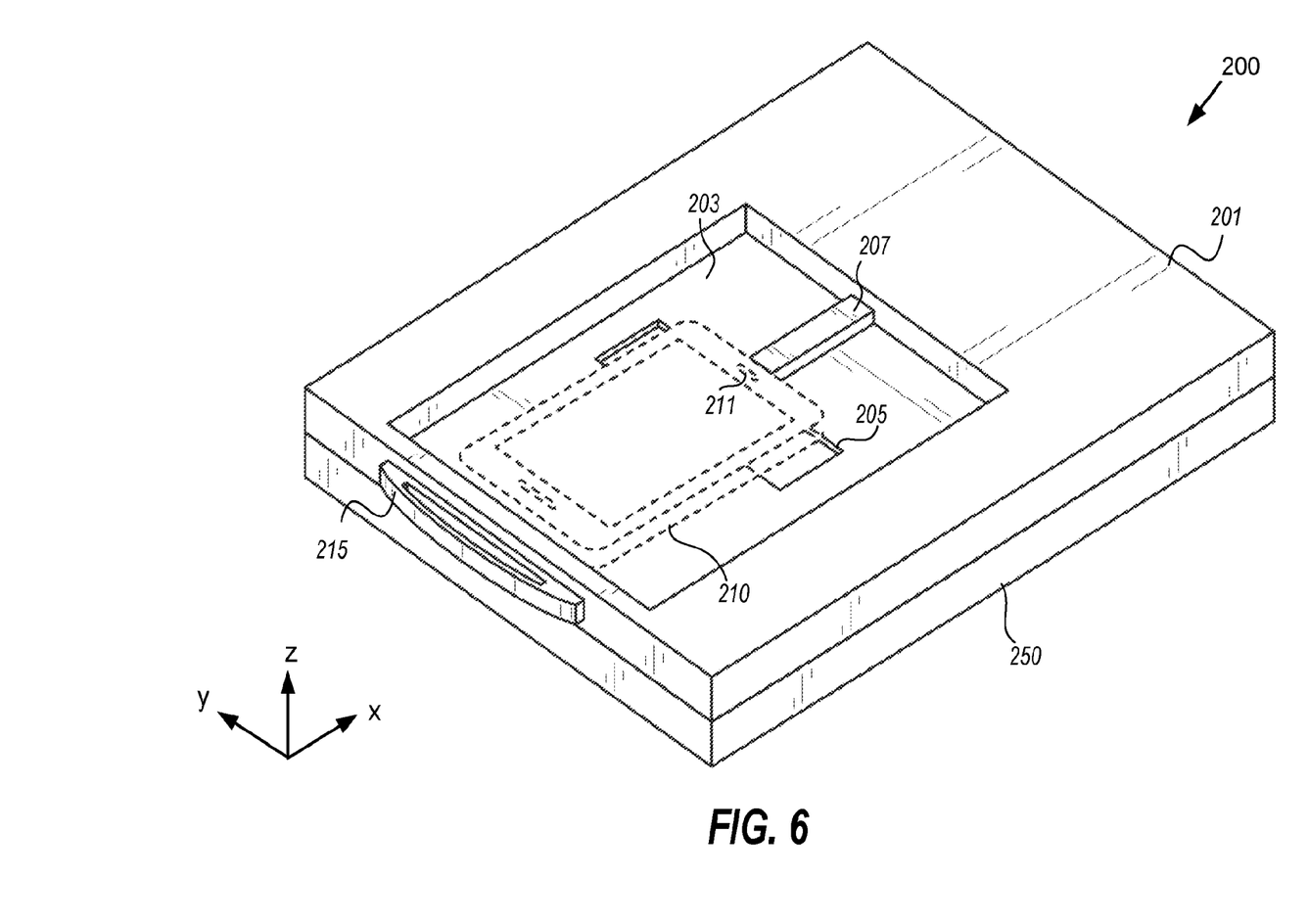
FIG. 6 illustrates a copier in a closed position according to an embodiment of the present disclosure.

FIG. 6 illustrates a copier in a closed position according to an embodiment of the present disclosure. In the closed position, the upper panel 201 and the lower panel 250 are in contact with each other and the extendible rods 230 and 231 are resting horizontally within the rod grooves 251 and 252 respectively. Furthermore, the object sensors 260a and 260b can be folded, extended or completely removed from the lower panel 250 to be able to close the copier. The web 262a and lip 263a can be folded or extended parallel to the base 261a for forming a horizontal strip. The web 262a and lip 263a can be folded inwards to touch the base 261a. Alternatively, the web 262a and the lip 263a can be extended backwards to not touch the base 261*a*. Similarly, the object size sensor 260*b* can be folded. Then the object size sensors 260*a* and 260*b* can be pushed towards the center of the lower panel 250. As such, the exemplary copier 200 can form a compact box which is easy to carry.

Figure 7:
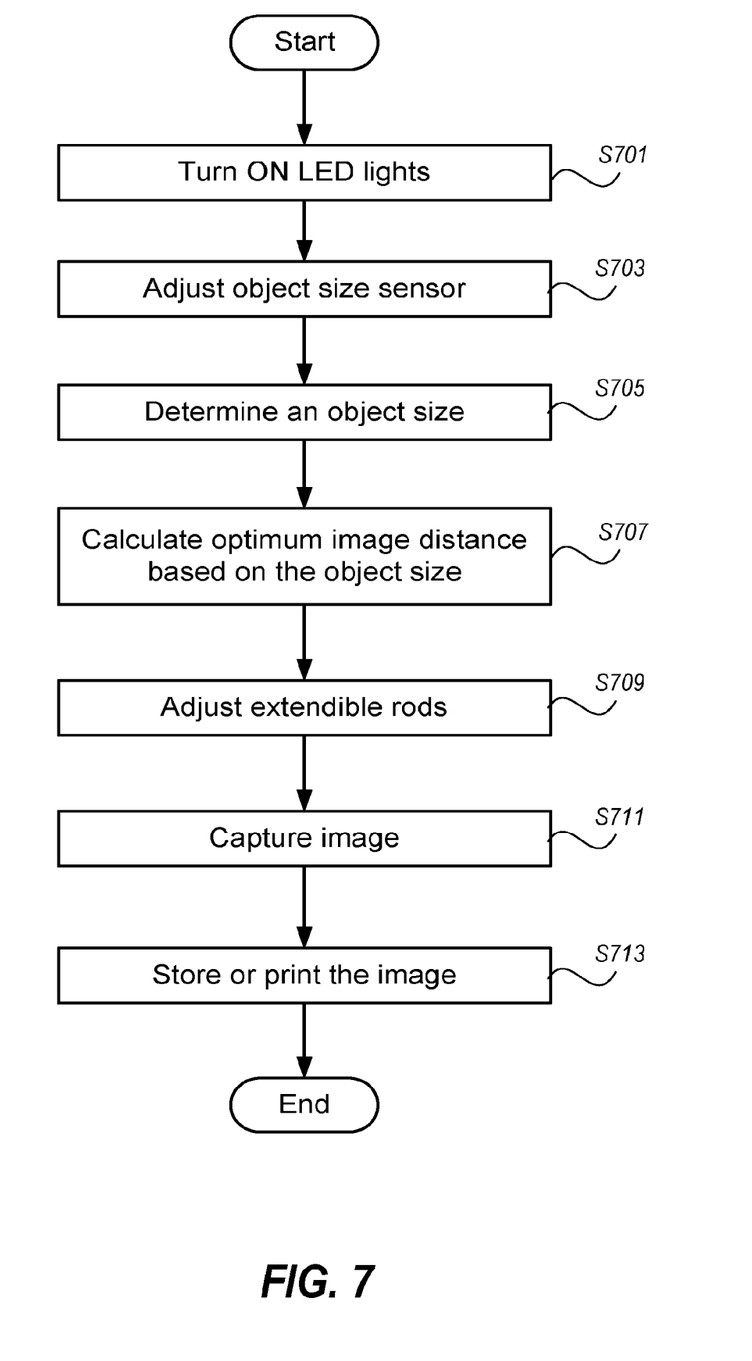
FIG. 7 is an exemplary flow chart for controlling the copier according to an embodiment of the present disclosure.

FIG. 7 is an exemplary flow chart for controlling the copier according to an embodiment of the present disclosure. The process starts when an object is placed on the lower panel 250 and the copier controller 120 reads the camera specification from the database 130. The copier controller 120 can operate automatically upon sensing that the object is placed on the lower panel 250 in response to an input from a user. In step S701, the plurality of LED lights 270*a*-270*f* is switched on. The plurality of LED lights 270*a*-270*f* can be switched on automatically based on proximity sensor or weight sensor that can detect a presence of an object. Alternatively, plurality of LED lights 270*a*-270*f* can be switched on manually by turning on a light switch provided on the lower panel 250. In step S703, the object size sensors are adjusted by moving them towards the edge of the object. For example, when a paper document is placed on the lower panel 250, the object size sensors 260*a* and 260*b* are moved till the paper edge is detected. The adjustment of object size sensors 260*a* and 260*b* can be automatic or manual as discussed with reference to the FIGS. 2-3.

Further, the object size such as length $L_{object}$ and width can be calculated by the copier controller 120, in step S705. For example, the object length is calculated as the distance between the webs 262*a* and 262*b*. The calculation can be based on the proximity sensor installed on the lower panel 250 or manually based on the distance markings, as discussed with respect to FIG. 4. The object size can be further used to determine the optimum object distance $D_{object}$, in step S707. The object distance can be retrieved from the database that correlates the object distance and the object size as discussed earlier in the present disclosure.

Alternatively, the object distance $D_{image}$ can be calculated using lens (optic) equations. For example for a single lens, the angle of view formula, in equations 1 and 2 can be used.

$$D_{object} = \frac{L_{object}/2}{\tan(\alpha/2)} \quad (1)$$

$$\alpha = 2 * \tan^{-1}\left(\frac{L_{image}}{f}\right) \quad (2)$$

Figure 9:
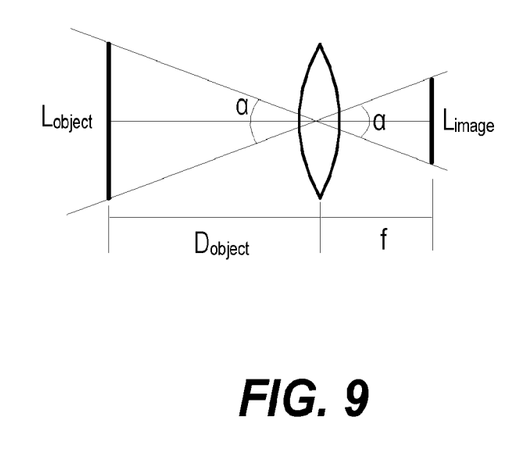
FIG. 9 illustrates a ray diagram for a single lens of a camera according to an embodiment of the present disclosure.

Equations 1 and 2 can be derived from a single lens ray diagram as illustrated in FIG. 9. Equation 1 indicates the object distance $D_{object}$ is directly proportional to the object size $L_{object}$ and inversely proportional to a tangent of an angle-of-view α. The angle-of-view α is a characteristic of a camera and can be different for different cameras. The angle-of-view α itself can be determined using the camera sensor dimension $L_{image}$ and the focal length f.

The object distance is further used to adjust the extendible rods, in step S709. For example, the extendible rods 230 and 231 can be adjusted to create the desired object distance. The extendible rods 230 and 231 can be controlled by the copier controller 120 or manually as discussed with respect FIGS. 1 and 2. In step S711, a camera captures the image of the object. The image capture command can be issued by the copier controller 120 after the extendible rods 230 and 231 are extended to a length significantly equal to the object distance. The captured image can be stored in a database or sent to a printer wirelessly, in step S713. The copier controller 120 can be programmed to display a selectable list of printers connected to the copier controller 120. The copier controller 120 and the external interfaces communicating with the copier controller 120 are discussed in further detail with respect to FIG. 8.

The above embodiment is not limited to sequential execution of the processes. In some embodiments, one or more processes can be performed in parallel. Further, one or more processes may be omitted. For example, the steps S701 and S703 can be performed in parallel or step S701 may be omitted when there is enough surrounding light.

Figure 8:
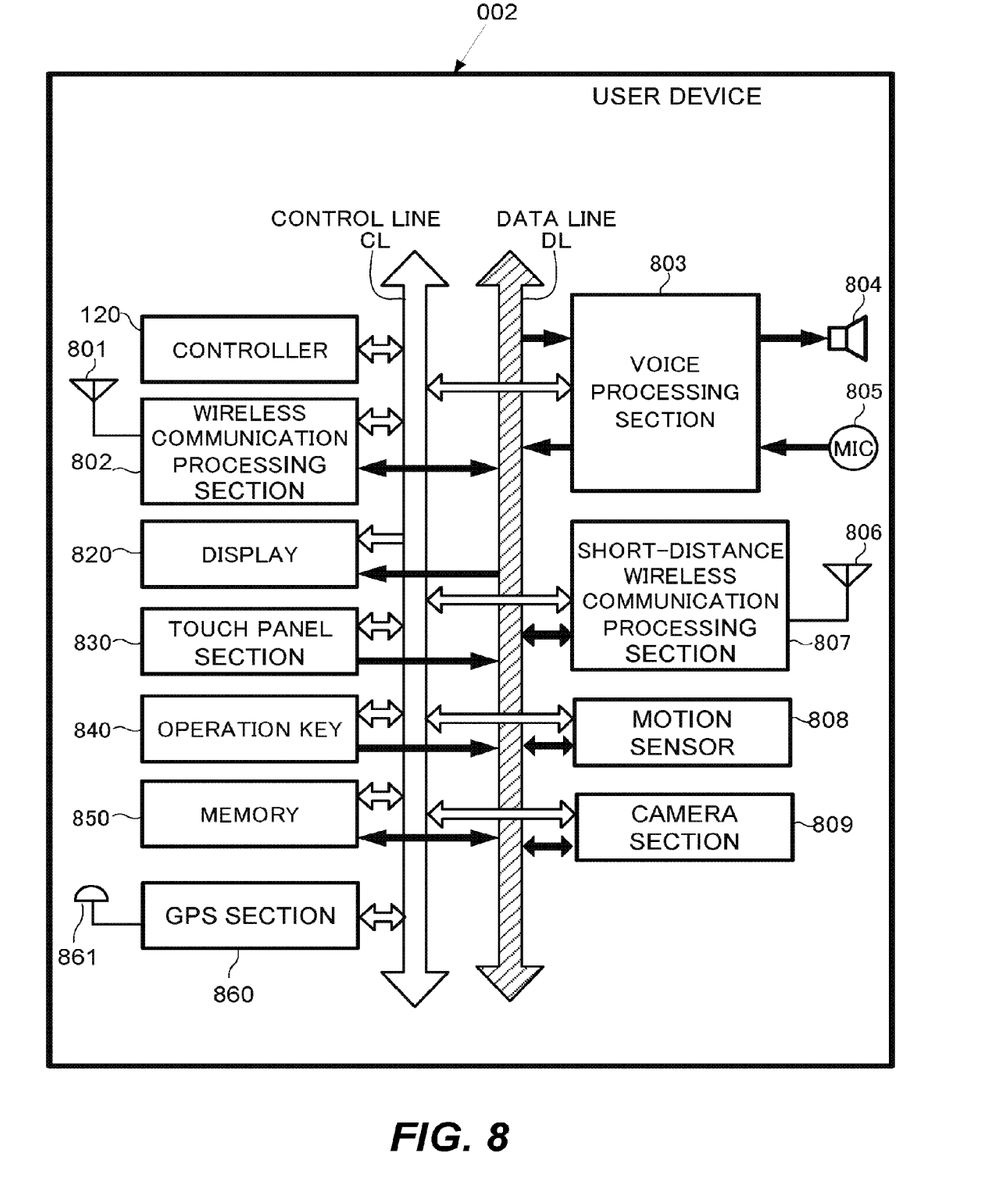
FIG. 8 is a block diagram of a controller of the exemplary copier according to an embodiment of the present disclosure.

FIG. 8 is a block diagram of a controller of the exemplary copier according to an embodiment of the present disclosure. In certain embodiments, the user device 20 may be a smartphone. However, the skilled artisan will appreciate that the features described herein may be adapted to be implemented on other devices (e.g., a laptop, a tablet, a server, an e-reader, a camera, a navigation device, etc.). The exemplary user device 20 of FIG. 1 includes a copier controller 120 and a wireless communication processor 802 connected to an antenna 801. Optionally, a speaker 804 and a microphone 805 are connected to a voice processor 803.

The controller 810 is an example of the copier controller 120 shown in FIG. 1 that implements the process discussed with respect to FIG. 7. The controller 810 may include one or more Central Processing Units (CPUs), and may control each element in the user device 20 to perform functions related to communication control, audio signal processing, control for the audio signal processing, still and moving image processing and control, and other kinds of signal processing. The controller 810 may perform these functions by executing instructions stored in a memory 850. Alternatively or in addition to the local storage of the memory 850, the functions may be executed using instructions stored on an external device accessed on a network or on a non-transitory computer readable medium. As described above in relation to FIG. 1, the controller 810 may execute instructions allowing the controller 810 to function as the motor control and image capture 140 as depicted in FIG. 1.

The memory 850 includes but is not limited to Read Only Memory (ROM), Random Access Memory (RAM), or a memory array including a combination of volatile and non-volatile memory units. The memory 850 may be utilized as working memory by the controller 810 while executing the processes and algorithms of the present disclosure. Additionally, the memory 850 may be used for long-term storage, e.g., of image data and information related thereto. The memory 850 may be configured to store the image captured by the camera 211, the list of commands performed by the copier controller 120, etc.

The user device 20 includes a control line CL and data line DL as internal communication bus lines. Control data to/from the controller 810 may be transmitted through the control line CL. The data line DL may be used for transmission of voice data, display data, etc.

The antenna 801 transmits/receives electromagnetic wave signals between base stations for performing radio-based communication, such as the various forms of cellular telephone communication. The wireless communication processor 802 controls the communication performed between the user device 20 and other external devices via the antenna 801. For example, the wireless communication processor 802 may control communication between base stations for cellular phone communication.

The speaker 804 emits an audio signal corresponding to audio data supplied from the voice processor 803. The microphone 805 detects surrounding audio and converts the detected audio into an audio signal. The audio signal may then be output to the voice processor 803 for further processing. The voice processor 803 demodulates and/or decodes the audio data read from the memory 850 or audio data received by the wireless communication processor 802 and/or a short-distance wireless communication processor 807. Additionally, the voice processor 803 may decode audio signals obtained by the microphone 805.

The exemplary user device 20 may also include a display 820, a touch panel 830, an operation key 840, and a short-distance communication processor 807 connected to an antenna 806. The display 820 may be a Liquid Crystal Display (LCD), an organic electroluminescence display panel, or another display screen technology. In addition to displaying still and moving image data, the display 820 may display operational inputs for control of the copier 10. The display 820 may additionally display a GUI for a user to control aspects of the user device 20 and/or other devices. Further, the display 820 may display characters and images received by the user device 20 and/or stored in the memory 850 or accessed from an external device on a network such as a camera. For example, the user device 20 may access a network such as the Internet and display text and/or images transmitted from a Web server.

The touch panel 830 may include a physical touch panel display screen and a touch panel driver. The touch panel 830 may include one or more touch sensors for detecting an input operation on an operation surface of the touch panel display screen. The touch panel 830 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 830 may detect when the stylus approaches/contacts the operation surface of the touch panel display (similar to the case in which a finger is used for the touch operation).

In certain aspects of the present disclosure, the touch panel 830 may be disposed adjacent to the display 820 (e.g., laminated) or may be formed integrally with the display 820. For simplicity, the present disclosure assumes the touch panel 830 is formed integrally with the display 820 and therefore, examples discussed herein may describe touch operations being performed on the surface of the display 820 rather than the touch panel 830. However, the skilled artisan will appreciate that this is not limiting.

For simplicity, the present disclosure assumes the touch panel 830 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 830 may include transparent electrode touch sensors arranged in the X-Y direction on the surface of transparent sensor glass.

The touch panel driver may be included in the touch panel 830 for control processing related to the touch panel 830, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 830 may detect a position of a user's finger around an edge of the display panel 820 (e.g., gripping a protective case that surrounds the display/touch panel). Signals may be transmitted by the touch panel driver, e.g. in response to a detection of a touch operation, in response to a query from another element based on timed data exchange, etc.

The touch panel 830 and the display 820 may be surrounded by a protective casing, which may also enclose the other elements included in the user device 20. In certain embodiments, a position of the user's fingers on the protective casing (but not directly on the surface of the display 820) may be detected by the touch panel 830 sensors. Accordingly, the controller 810 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 810 may be configured to detect which hand is holding the user device 20, based on the detected finger position. For example, the touch panel 830 sensors may detect a plurality of fingers on the left side of the user device 20 (e.g., on an edge of the display 820 or on the protective casing), and detect a single finger on the right side of the user device 20. In this exemplary scenario, the controller 810 may determine that the user is wearing the user device 20 with his/her right hand because the detected grip pattern corresponds to an expected pattern when the user device 20 is wearing only with the right hand.

The operation key 840 may include one or more buttons or similar external control elements, which may generate an operation signal based on a detected input by the user. In addition to outputs from the touch panel 830, these operation signals may be supplied to the controller 810 for performing related processing and control. In certain aspects of the present disclosure, the processing and/or functions associated with external buttons and the like may be performed by the controller 810 in response to an input operation on the touch panel 830 display screen rather than the external button, key, etc. In this way, external buttons on the user device 20 may be eliminated in lieu of performing inputs via touch operations, thereby improving water-tightness.

The antenna 806 may transmit/receive electromagnetic wave signals to/from other external apparatuses, and the short-distance wireless communication processor 807 may control the wireless communication performed between the other external apparatuses. Bluetooth®, IEEE 802.11, and near-field communication (NFC) are non-limiting examples of wireless communication protocols that may be used for inter-device communication via the short-distance wireless communication processor 807.

The user device 20 may include a motion sensor 808. The motion sensor 808 may detect features of motion (i.e., one or more movements) of the user device 20. For example, the motion sensor 808 may include an accelerometer to detect acceleration, a gyroscope to detect angular velocity, a geomagnetic sensor to detect direction, a geo-location sensor to detect location, etc., or a combination thereof to detect motion of the user device 20. In certain embodiments, the motion sensor 808 may generate a detection signal that includes data representing the detected motion. For example, the motion sensor 808 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 810, whereby further processing may be performed based on data included in the detection signal. The motion sensor 808 can work in conjunction with a Global Positioning System (GPS) section 860. An antenna 861 is connected to the GPS section 860 for receiving and transmitting signals to and from a GPS satellite.

The user device 20 may include a camera section 809, which includes a lens and shutter for capturing photographs of the surroundings around the user device 20. In an embodiment, the camera section 809 captures surroundings of an opposite side of the user device 20 from the user. The images of the captured photographs can be displayed on the display panel 820. A memory section saves the captured photographs. The memory section may reside within the camera section 809. The camera section 809 can be a separate feature attached to the user device 20 or it can be a built-in camera feature.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. The portable copier system comprising:
    an upper panel including a device groove and a camera slot;
    an object sensor for measuring an object size and detecting presence or absence of an object;
    a lower panel fitted with a plurality of guides, each of the plurality of guides being attached with the object sensor;
    an adjustment mechanism including a plurality of extendible rods, each of the plurality of extendible rods being connected to the upper panel and supported by the lower panel;
    an image capture device mounted on the device groove; and
    a controller that controls the adjustment mechanism based on data from the object sensor and sends signals to the image capture device.

2. The portable copier system according to claim 1, wherein
    the camera slot is positioned at the center of the upper panel.

3. The portable copier system according to claim 1, wherein
    the device groove includes a device holder.

4. The portable copier system according to claim 1, wherein
    the object sensor attached to each of the plurality of guides is an optical sensor.

5. The portable copier system according to claim 1, wherein
    the lower panel includes a plurality of rod grooves corresponding to the plurality of extendible rods of the adjustment mechanism.

6. The portable copier system according to claim 1, wherein
    the lower panel includes one or more light sources.

7. The portable copier system according to claim 6, wherein
    the one or more light sources includes at least one LED light.

8. The portable copier system according to claim 1, wherein
    the lower panel includes at least one guide groove supporting a plurality of guides in a sliding manner.

9. The portable copier system according to claim 8, wherein
    each of the plurality of guides is attached to a spring and a cord.

10. The portable copier system according to claim 9, wherein
    a first end of the cord is wrapped around a motor shaft and a second end is connected to one of the plurality of guides.

11. The portable copier system according to claim 1, wherein
    each of the plurality of extendible rods is a telescopic cylinder actuated by pneumatic or hydraulic pressure.

12. The portable copier system according to claim 1, wherein
    each of the plurality of extendible rods is a screw driven by a motor.

13. The portable copier system according to claim 1, wherein
    the controller sends to and receives signals from a database.

14. A method for controlling a portable copier including an first panel and a second panel, the method comprising:
    turning on a plurality of lights;
    adjusting a plurality of guides on the first panel, wherein each of the plurality of paper guides is attached with an object sensor;
    determining an object size of an object positioned on the first panel;
    calculating an optimum object distance based on the object size;

adjusting a plurality of extendible rods extending between the first panel and the second panel to move the second panel with respect to the first panel;
capturing an image of an object; and
storing or printing the image of the object.

15. The method for controlling a portable copier according to claim 14, wherein
the object size is determined based on a distance between at least two of the plurality of guides installed along a same axis.

16. A non-transitory computer-readable medium storing a program which when executed by a computer, causes the computer to perform a method for controlling a portable copier including an first panel and a second panel, the method comprising:
turning on a plurality of lights;
adjusting a plurality of guides on the first panel, wherein each of the plurality of paper guides is attached with an object sensor;
determining an object size of an object positioned on the first panel;
calculating an optimum object distance based on the object size;
adjusting a plurality of extendible rods extending between the first panel and the second panel to move the second panel with respect to the first panel;
capturing an image of an object; and
storing or printing the image of the object.

* * * * *